(12) United States Patent
Schnitzer et al.

(10) Patent No.: US 8,302,503 B2
(45) Date of Patent: Nov. 6, 2012

(54) STEERING COLUMN FOR A MOTOR VEHICLE

(75) Inventors: Rony Schnitzer, Ruggell (LI); Thomas Heitz, Mauren (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 457 days.

(21) Appl. No.: 12/312,813

(22) PCT Filed: Nov. 24, 2007

(86) PCT No.: PCT/EP2007/010233
§ 371 (c)(1),
(2), (4) Date: May 28, 2009

(87) PCT Pub. No.: WO2008/064841
PCT Pub. Date: Jun. 5, 2008

(65) Prior Publication Data
US 2010/0064839 A1 Mar. 18, 2010

(30) Foreign Application Priority Data

Nov. 29, 2006 (DE) .......................... 10 2006 056 582

(51) Int. Cl.
*B62D 1/16* (2006.01)

(52) U.S. Cl. ....................................................... 74/492

(58) Field of Classification Search ................... 74/485, 74/492, 493, 495; 280/775
See application file for complete search history.

(56) References Cited

U.S. PATENT DOCUMENTS

| 5,052,715 | A | * | 10/1991 | Ervin et al. ................... 280/775 |
| 5,417,452 | A | * | 5/1995 | Khalifa et al. ................ 280/777 |
| 5,992,263 | A | | 11/1999 | Bleuel et al. |
| 6,443,491 | B1 | * | 9/2002 | Fukunaga ..................... 280/779 |

FOREIGN PATENT DOCUMENTS

| DE | 196 29 246 | | 1/1998 |
| DE | 103 52 224 | | 6/2005 |
| DE | 10 2004 010 791 | | 9/2005 |
| EP | 1 609 693 | | 12/2005 |
| EP | 1 612 120 | | 1/2006 |
| JP | 2000062624 A | * | 2/2000 |
| JP | 2002-145078 | | 5/2002 |

OTHER PUBLICATIONS

International Search Report issued Mar. 3, 2008 in the International (PCT) Application of which the present application is the U.S. National Stage.
Lange, Kurt. *Deformation Technique—Manual for Industry and Science, vol. 3—Sheet Metal Forming.* Heidelberg: Springer-Verlag, 1990 (including English translation).

* cited by examiner

*Primary Examiner* — Vicky Johnson
(74) *Attorney, Agent, or Firm* — Wenderoth, Lind & Ponack, L.L.P.

(57) ABSTRACT

The invention relates to a steering column for a motor vehicle with a steering spindle pivotably supported by a jacket unit and a securement unit rigidly securable on the motor vehicle and bearing the jacket unit. The securement unit includes a base section, at least one side jaw extending next to the jacket unit, and at least first and second securement plates with bolt openings for the securement of the securement unit on the motor vehicle by means of securement bolts. The first and second securement plates are each inclined with respect to the at least one side jaw by an angle in the range between 15° and 75°, and preferably between 30° and 60°.

14 Claims, 5 Drawing Sheets

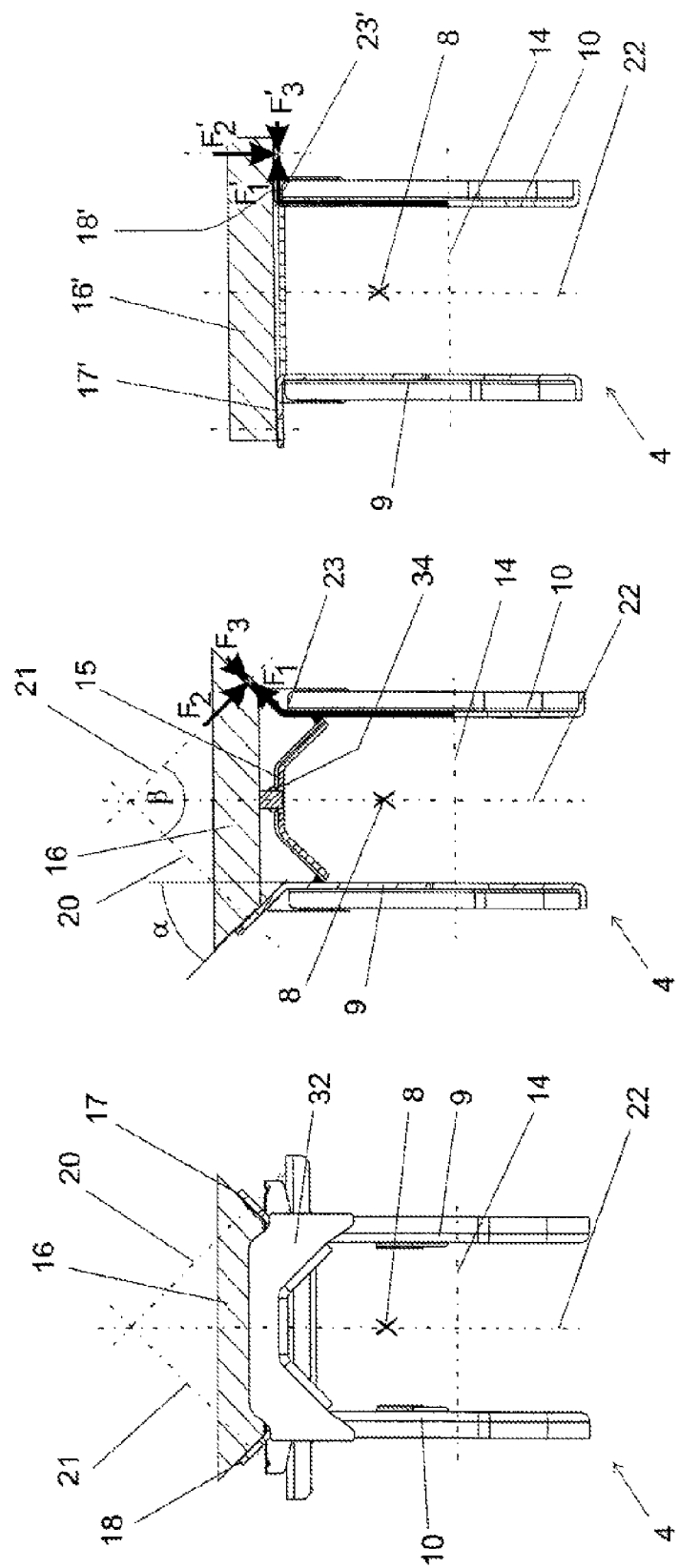

STEERING COLUMN FOR A MOTOR VEHICLE

This application is the National Stage of International Application PCT/EP2007/010233, filed Nov. 24, 2007, and claims priority to German application 10 2006 056 582.7, filed Nov. 29, 2006. Thus, the subject matter of those applications is incorporated herein by reference.

BACKGROUND OF THE INVENTION a) Field of the Invention

The invention relates to a steering column for a motor vehicle with a steering spindle pivotably supported by a jacket unit and a securement unit rigidly secured on the motor vehicle and bearing the jacket unit. The securement unit comprises a base section, at least one side jaw extending next to the jacket unit and at least first and second securement plates with bolt openings for securing the securement unit on the motor vehicle by means of securement bolts.

b) Description of Related Prior Art

A steering column of the above described type is disclosed, for example in EP 1 612 120 A1. In this steering column, the jacket unit pivotably supporting the steering spindle in the opened state of a fixing device is displaceable in the longitudinal direction of the steering spindle and in the direction of an inclination adjustment of the steering spindle with respect to a securement unit bearing the jacket unit. In the closed state of the fixing device, the set position of the jacket unit is fixed with respect to the securement unit. The securement unit is bolted onto the body of the motor vehicle by means of bolts, wherein the bolt holes penetrate four securement plates which project laterally from the securement unit and herein are oriented at right angles to the side jaws of the securement unit, between which, in the opened state of the fixing device, the jacket unit is displaceably guided in the direction of the inclination adjustment of the steering spindle.

In the case of the steering column disclosed in EP 1 609 693 A2, the securement on the body of the motor vehicle also takes place by bolting onto it a securement unit which bears the jacket unit pivotably supporting the steering spindle. The inclination of the steering spindle is adjustable, the adjustment being driven by a motor. Approximately on the axial position of the adjustment operation, the securement unit has laterally projecting securement plates with bolt openings in order to secure the steering column on the body of the motor vehicle by means of bolts, the axes of which are oriented parallel to the side jaws of the securement unit, between which side jaws is guided the jacket unit.

DE 103 52 224 A1 describes a steering column in which a stable securement on the body of the motor vehicle is to be attained. For this purpose, a securement unit is proposed which is secured on the passenger cabin cross member as well as also on the front wall between motor and passenger compartment. This securement unit is formed solidly and is comprised of a cast part. In the proximity of the steering column, in which is disposed the clamping system for the optional fixing and releasing of an adjustment of the steering column, the securement unit is secured on the motor vehicle with bolts, the axes of which are oriented parallel to the side jaws which guide the jacket unit during its adjustment in the height direction.

In the steering column disclosed in DE 10 2004 010 791 A1 a securement unit of the steering column is secured in position on a body-stationary steering column holder. The securement unit includes herein laterally projecting securement plates with bolt openings, through which project the securement bolts for bolting them to the steering column holder. The axes of bolts are oriented parallel to the side jaws of the securement unit, between which the jacket unit pivotably supporting the steering spindle is guided.

A disadvantage in these known steering columns is that for the reduction of the vibration tendency and to attain the requisite rigidity of the securement of the steering column, highly massive and heavy securement units are required.

SUMMARY OF THE INVENTION

The invention addresses the problem of providing a steering column of the type described in the introduction, which can be secured at high strength and rigidity values on the motor vehicle body, wherein a comparatively low material deployment is necessary.

This is attained according to the invention in that the first and second securement plates are each disposed such that, with respect to the at least one side jaw, they are inclined by an angle in the range between 15° and 75°, and preferably between 30° and 60°.

Consequently, in a steering column according to the invention first and second securement plates of the securement unit, via which the steering column can be secured at a body-stationary part of the motor vehicle, are each inclined with respect to the at least one side jaw by an angle in the range between 15° and 75°, and preferably between 30° and 60°. Through the invention a large material saving is attained, wherein nevertheless the requisite strength and rigidity values are attained. In a steering column according to the invention results an advantageous force development and a low tendency toward intrinsic vibration. Optimally, and thus especially to be preferred, the first and second securement plates of the securement unit, via which the steering column can be secured on a body-stationary part of the motor vehicle, are each inclined by an angle of 45° with respect to the at least one side jaw.

Through the disposition according to the invention of the first and second securement plates, tolerances of the securement unit of the steering column and/or of the body-stationary part, on which these securement plates are to be disposed, can advantageously also be accepted.

The securement unit comprises preferably two side jaws which extend bilaterally to the jacket unit in parallel planes and which are connected via the base section. If the jacket unit is displaceable with respect to the securement unit for setting the position of the steering wheel, the jacket unit can be guided between the two side jaws into the appropriate displacement direction, for example the direction of the inclination adjustment of the steering spindle. In the closed state of the fixing device securing in position the adjustment of the steering column, the two side jaws can be pressed onto the jacket unit.

In an advantageous embodiment variant of the invention, in an axial region of the steering column further removed from the steering wheel-side end of the steering spindle, in addition to the first and second securement plates, third and fourth securement plates are provided on the securement unit. In another embodiment variant these securement plates can project laterally from the securement unit at right angles to the side jaws of the securement unit. In a further embodiment variant, the third and fourth securement plates are also inclined, wherein they are preferably located in the same planes as the first and second securement plates.

The steering column is preferably adjustable in the axial direction of the steering spindle and/or in height or inclination.

Further advantages and details of the invention will be explained in the following in conjunction with the attached drawing.

BRIEF DESCRIPTION OF THE DRAWINGS

In the drawings:

FIG. 4 is a view of the securement unit (viewing direction B in FIG. 3), wherein a body-stationary motor vehicle part, on which the steering column is to be secured, is shown schematically, FIG. 5 is a section view along line A-A of FIG. 3 with a schematic depiction of the body-stationary motor vehicle part and a symbolic depiction of forces, FIG. 6 is a comparative depiction of a securement unit according to prior art.

DETAILED DESCRIPTION OF THE INVENTION

Figure 1:
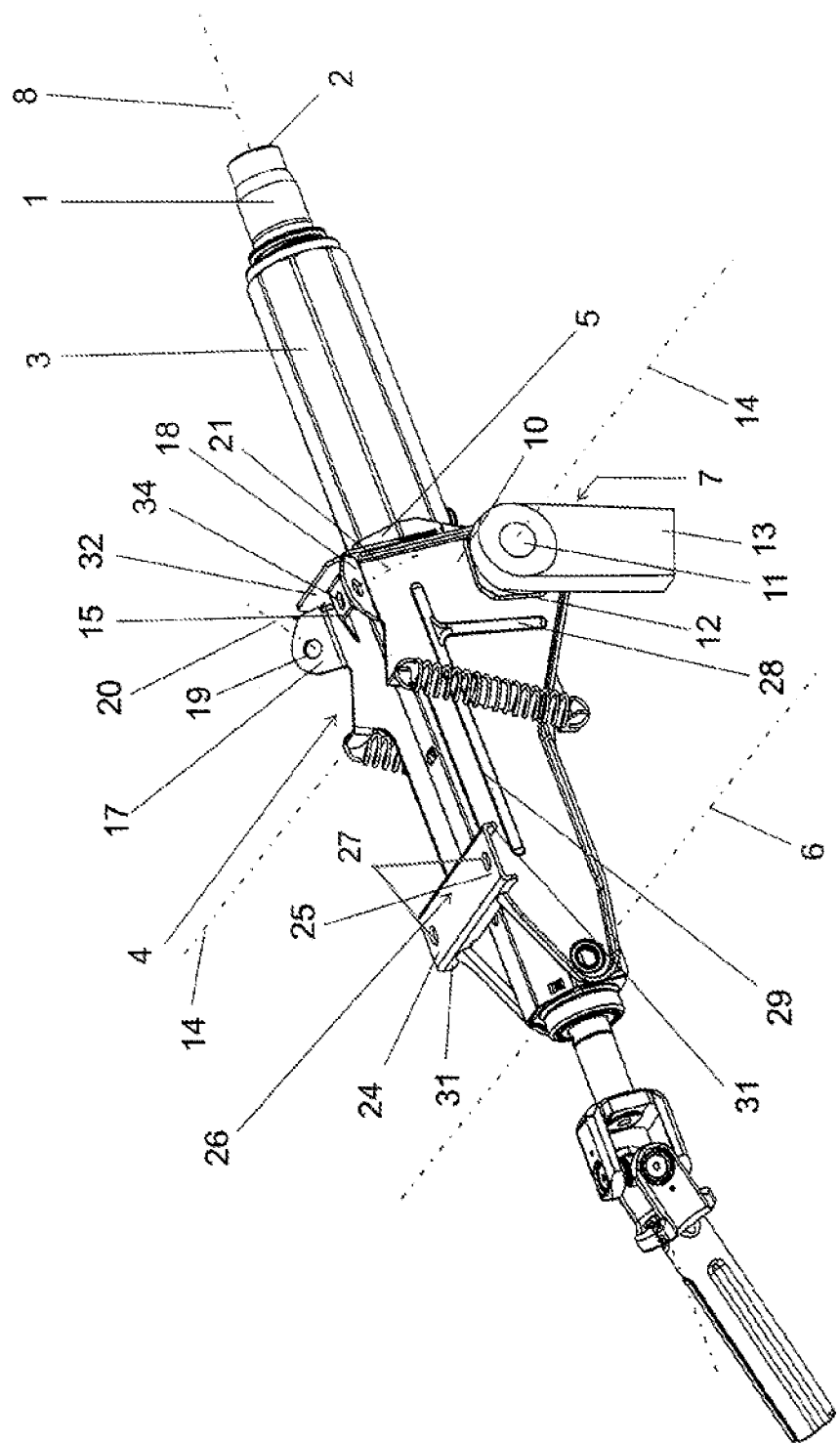
FIG. 1 shows a first embodiment example of a steering column according to the invention in oblique view.
Figure 2:
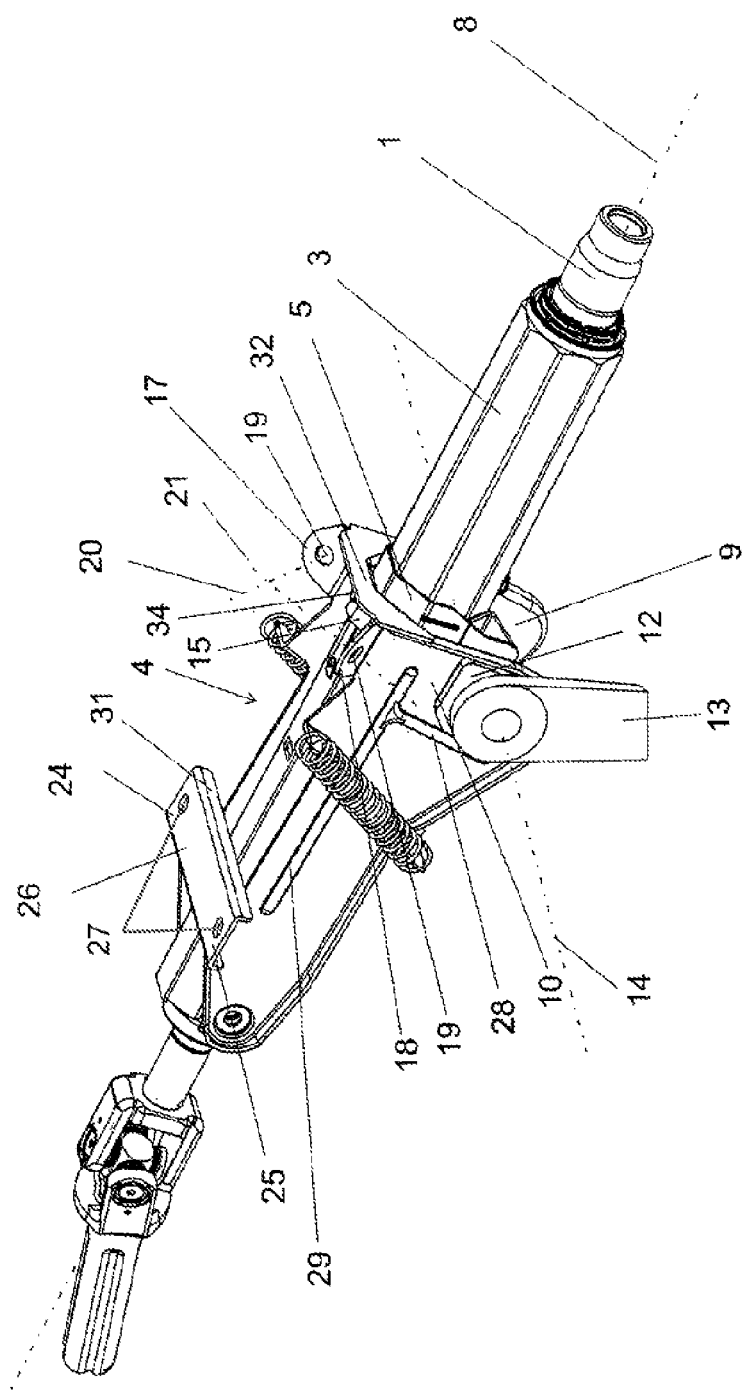
FIG. 2 is an oblique view of the steering column of FIG. 1 from a different viewing direction.
Figure 3:
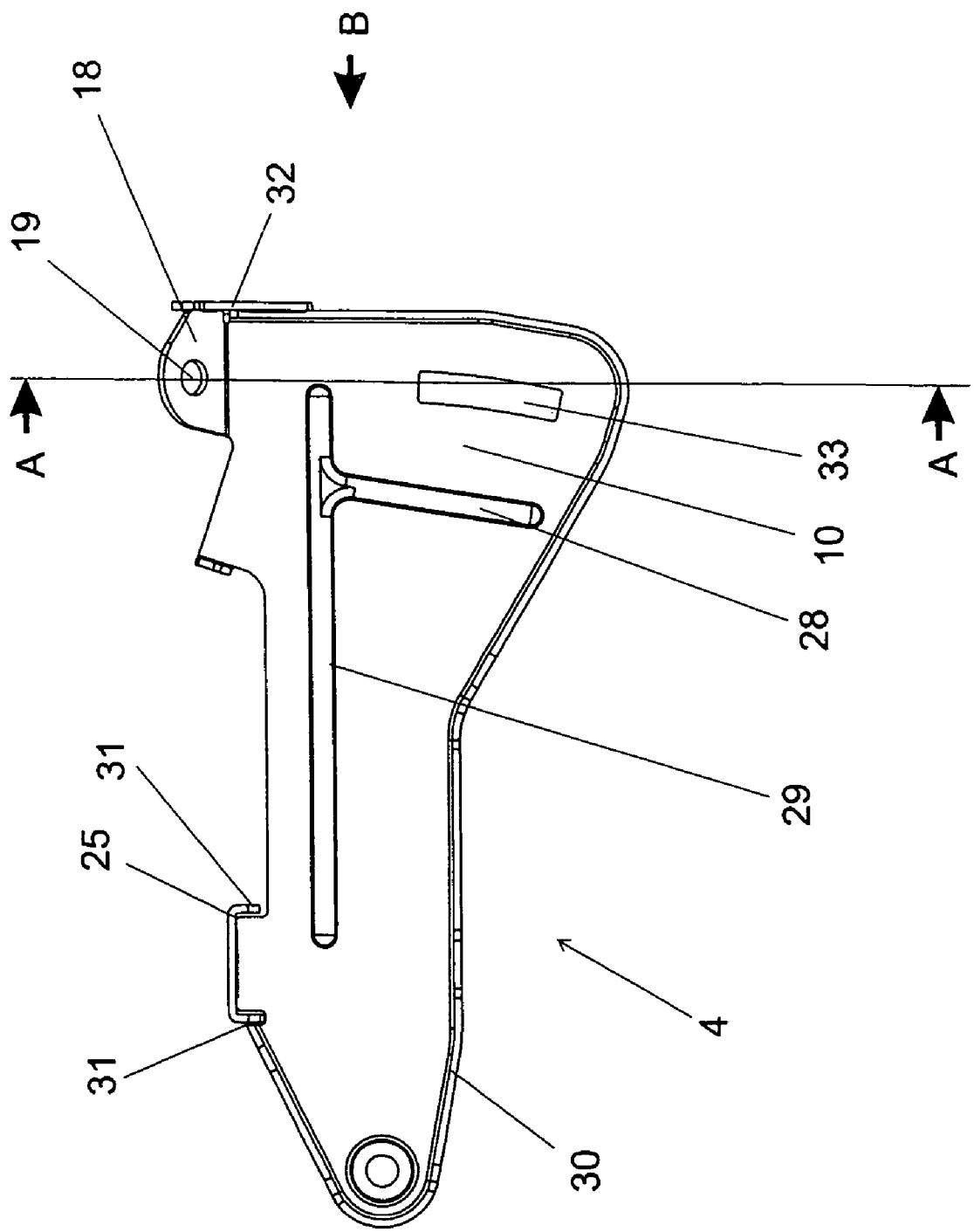
FIG. 3 shows the securement unit of the steering column of FIG. 1 in side view.

A first embodiment of a steering column according to the invention is depicted in FIGS. 1 to 5. The steering column comprises a steering spindle 1, on the steering-wheel-side end 2 of which a steering wheel can be affixed. The steering spindle 1 is pivotably supported in a jacket unit 3.

The steering column can be secured body-tight on the motor vehicle by means of a securement unit 4. The securement unit 4 bears the jacket unit 3 with the steering spindle 1 pivotably supported therein.

In the depicted embodiment example a holding part 5 is disposed between the jacket unit 3 and the securement unit 4. In the opened state of a fixing device 7, this holding part 5 is swivellable with respect to the securement unit 4 about a swivel axis 6 in order to adjust the inclination of the steering spindle 1 (resulting in a height adjustment of steering column). In the opened state of the fixing device 7, furthermore, the jacket unit 3 is displaceable with respect to the holding part 5 in the direction of the longitudinal axis 8 of the steering spindle 1 (resulting in a length adjustment of the steering column).

On the surface directed away from the steering spindle 1, the jacket unit 3 includes in the circumferential direction several planar surface sections. The holding part 5, which at least partially encompasses the jacket unit 3, also includes several planar surface sections in the circumferential direction. The planar surface sections of the jacket unit 3 and of the holding part 5 extend in the direction of the longitudinal axis 8 of the steering spindle 1 and at least three each of such planar surface sections, which are each located at an angle with respect to one another, can, in the closed state of the fixing device 7, be brought into frictional-locking or frictional- and form-locking contact in order to fix the set longitudinal position of the jacket unit 3. Through this realization, the jacket unit 3 with respect to the holding part 5, furthermore, is secured against torsion about the longitudinal axis 8 of the steering spindle 1.

The securement unit 4 comprises two side jaws 9, 10, connected by a base section 15, which have areal extensions and which extend bilaterally next to the jacket unit 3. In the embodiment according to FIGS. 1 to 5, they are located laterally next to the holding part 5 at least partially encompassing the jacket unit 3. In the closed state of the fixing device 7, the side jaws 9, 10 are pressed onto the holding part 5, wherein the cooperating faces of the side jaws 9, 10 and of the holding part 5 are brought into frictional-locking or frictional- and form-locking contact in order to secure in position the swiveling of the holding part 5, and thus of the jacket unit 3, with respect to the securement unit 4.

To make possible a swivelling of the holding part 5 with respect to the securement unit 4 in the opened state of the fixing device 7, in the side jaws 9, 10 elongated holes 33 (cf. FIG. 3) are disposed which are penetrated by a fixing bolt 11. The fixing bolt 11 penetrates, further, openings in the holding part 5. These are disposed in the proximity of the two longitudinal edges of the holding part 5 delimiting the lower open section of the holding part.

The fixing device 7 is not depicted in detail in the Figures. It can, in a conventional manner, include a link washer 12 and a cam rotatable by an actuation lever 13, upon a swivelling of the same, about the clamping axis 14. During the closure of the fixing device 7 the link washer 12 and a counterholder (for example head of the fixing bolt 11), disposed on the side of the fixing bolt 11 opposite the actuation lever 13, are pressed against the side jaws 9, 10. The fixing device is consequently implemented in the embodiment example as a clamping mechanism.

For its securement on a body-stationary motor vehicle part 16, the securement unit 4 comprises first and second securement plates 17, 18 provided with bolt openings 19. Through these bolt openings 19, the securement unit 4 can be bolted to the body-stationary motor vehicle part 16 by means of securement bolts (not shown in the Figures).

With respect to the side jaws 9, 10 the securement plates 17, 18 are inclined about axes parallel to the longitudinal axis 8 of steering spindle 1. This means the securement plates 17, 18 have, at least in the proximity of the bolt openings 19, planar sections which are located in planes which form with the planes in which extend the side jaws 9, 10 angles, which, in the depicted embodiment example, are 45°. These angles α can be in the range of 15° and 75°, and preferably between 30° and 60°. Herein the angle α is measured between the plane of a planar section of side jaw 9, 10, on which the jacket unit 3 is in contact, and the plane of the planar section of securement plate 17, 18 and specifically on the side of the securement plate 17, 18 facing the motor vehicle part 16. That means angle α is the smaller of the angles formed by the plane of the planar section of side jaw 9, 10 and the plane of the planar section of securement plate 17, 18. The two securement plates 17, 18 are herein oriented with respect to one another so that the distance of the planar sections of the securement plates 17, 18 increases with progressively increasing distance from the longitudinal axis 8 of steering spindle 2. The securement plates 17, 18 are consequently inclined away from a vertical plane 22 penetrating the longitudinal axis 8 of steering spindle 1.

The longitudinal axes 20, 21 of bolt openings 19 (=the securement axes in which extend securement bolts cooperating with the securement plates 17, 18) are thus each correspondingly inclined with respect to the normals to the planes of the side jaws 9, 10 and are located with advantage in a plane at right angles to the longitudinal axis 8 of steering spindle 1. In the depicted embodiment, the longitudinal axes 20, 21 form an angle β of 90° (measured on the side facing the steering spindle 1). This angle β can be in the preferred angular range between 60° and 120°.

The first and second securement plate 17, 18 are disposed bilaterally to vertical plane 22 extending through the longitudinal axes 8 of steering spindle 1, wherein they preferably extend at a mutual distance from securement unit 4, which distance is at least equal to the distance between the side jaws 9, 10. It is preferred that the two securement plates 17, 18 have the same distance from the steering wheel-side end 2 of the steering spindle 1.

In the depicted embodiment example, the first securement plate 17 extends from the one side jaw 9 and the second securement plate 18 from the other side jaw 10, wherein they are implemented integrally with the particular side jaw and, to form their inclination with respect to the particular side jaw 9, 10, are correspondingly angled-off. The securement plates 17, 18 extend herein from the upper (referring to the installation position) edge of the particular side jaw 9, 10.

The first and second securement plate 17, 18 can also be formed by separate parts secured in place on the side jaws 9, 10. The securement plates 17, 18 can furthermore also extend from other portions of the securement unit 4, for example from the base section 15.

The planes in which the two securement plates 17, 18 are located or in which are located the planar sections of the securement plates 17, 18 encompassing the bolt openings 19, preferably intersect in the proximity of the longitudinal axes 8 of the steering spindle 1. These two planes intersect herein preferably along a line, this line preferably being located at least within the jacket unit 3 or, especially preferred, within the steering spindle 1. It is herein evident that in the case of steering spindle 2, which is height-adjustable with respect to the securement unit 4, the line of intersection of these planes lies at varying distances with respect to the longitudinal axis 8 of steering spindle 2 depending on the setting of the steering spindle 2.

FIG. 5 shows symbolically the transmission of forces via one of the securement plates 17, 18 (involved is here a symbolic representation and not a true balance of forces). The forces acting onto the steering spindle are transmitted via the side jaws 9, 10 of the securement unit, wherein via each of the securement plates 17, 18 at least a portion of these forces is deflected onto a body-stationary motor vehicle part 16. Force F1 introduced onto the securement plate must be absorbed via the deflection point 23 by the tension force F2 of the securement bolt cooperating with the securement plate. Force F2 acts perpendicularly to the plane of the securement plate 17, 18, and by the friction force F3, acting in the plane of the securement plate 17, 18, between the securement plate 17, 18 and the body-stationary motor vehicle part 16. In the realization according to the invention, this force transmission is substantially more efficient than in a conventional realization of the securement unit, which is shown by comparison in FIG. 6. The securement plates 17', 18' are here at right angles to the planes of the side jaws 9, 10 and are bolted together with the body-stationary motor vehicle part 16'. Parts analogous to parts as described previously in the embodiment example according to the invention are provided with the same reference symbols. The transmission of the force F1' introduced into the particular side jaw 9, 10 and the absorption of this force by the normal component F2' of the holding force and the friction component F3' of the holding force is here substantially less efficient, wherein force F1' is conducted about a deflection point 23', whose deflection is 90°, in contrast to the deflection angle in the deflection point 23 of 15° and 75°, and preferably between 30° and 60° according to the invention. It is herein evident that with progressive restriction of the angular range in the deflection point 23 close to the 45°, the deflection of the force is improved. The greater the deviation from 45°, the greater is the difference between the force components, parallel to the vertical plane 22 and perpendicularly to the vertical plane 22, into which the force, introduced into the deflection point, is split. In order for the force to be, in fact, deflected and introduced into the motor vehicle part 16, the two force components must be braced in the securement unit 4 in the proximity of the deflection point 23. The securement unit 4 must be laid out such that it is correspondingly solid and rigid. In the case that the securement unit is not laid out sufficiently solid and rigid, a deformation of the securement unit occurs in response to the introduced force. However, these deformations are never desirable and lead to an insecure sense of steering and to negative vibration behavior. In the case of a deflection angle of 90°, the demands made of the securement unit 4 are correspondingly especially high. However, with a deflection angle in the range of 30° to 60° a considerable improvement of the clamping conditions in the proximity of the deflection point 23 is attained. Through the solution according to the invention the loadings in the securement unit correspondingly sink considerably. It thus becomes possible to dimension the securement unit with significantly lesser cross sections at the same loadings.

The difference of the two force components is so far reduced that the use of a securement unit 4 implemented as a simple cutting-and-bending part of sheet metal with a simple reinforcement sheet metal, which is also implemented as a simple cutting-and-bending part of sheet metal, is adequate to meet in most cases the demands made of rigidity.

In addition to the securement plates 17, 18, the securement unit according to the invention in the depicted embodiment comprises further securement elements, which are formed by a third and a fourth securement plate 24, 25, which have a greater distance from the steering wheel-side end 2 of the steering spindle 1 than the first and second securement plate 17, 18 and which project from the securement unit 4 on both sides of vertical plane 22. This third and fourth securement plate 24, 25 in this embodiment example is formed by sections, projecting laterally with respect to the side jaws 9, 10, of a transverse web 26 of securement unit 4. The securement plates 24, 25 are herein in planes at right angles to the side jaws 9, 10. For the securement on the motor vehicle by means of securement bolts, again bolt openings 27 are provided.

The third and fourth securement plate could also be inclined with respect to the side jaws 9, 10 analogously to the first and second securement plate 17, 18, as will be described below in connection with the embodiment according to FIG. 8.

The securement unit in the depicted embodiment is implemented as a cutting-and-bending part of sheet metal. To reinforce the securement unit 4, in the side jaws 9, 10 reinforcement beads 28, 29 are formed. The side jaws 9, 10, as depicted, can also be provided with flanging-over 30 on the margin-side. Flanging-over 31 can also be provided, for example, on the margins of the transverse web 26 and/or on the base section 15.

On the steering wheel-side end of the securement unit 4 in the depicted embodiment is furthermore welded on a reinforcement sheet metal 32, which extends in a plane at right angles to the longitudinal axis 8 of steering spindle 1 and is disposed on both side jaws 9, 10. In the depicted example, the reinforcement sheet metal 32 is formed integrally with the base section 15. However, two- and multi-part embodiments are also conceivable and feasible.

Side jaws 9, 10 and/or base section 15 of securement unit 4 can also be comprised of several parts rigidly connected with one another. One part could, for example, form a steering wheel-side section of the securement unit 4 and one part a steering wheel-remote section of the securement unit 4. An implementation other than in the form of a cutting-and-bending part of sheet metal is also conceivable and feasible.

The securement unit 4 could, for example, also include a securement part in order to degrade energy in the event of a crash. In this case, the securement plates 17, 18, 24, 25 are on this securement part. Such an energy degradation can alternatively or additionally also be attained through a slipping-through of the jacket unit 3 with respect to the holding part 5.

However, in a further development of the invention, positioning means 34 can additionally be provided, which additionally defines the position of the securement unit 4 to the motor vehicle part 16. This additional positioning means 34 can be applied for simplification of the mounting of the steering column in the motor vehicle. In the simplest case, a bore in the securement part 4 is herein involved, which cooperates with a pin in the motor vehicle part 16.

Figure 7:
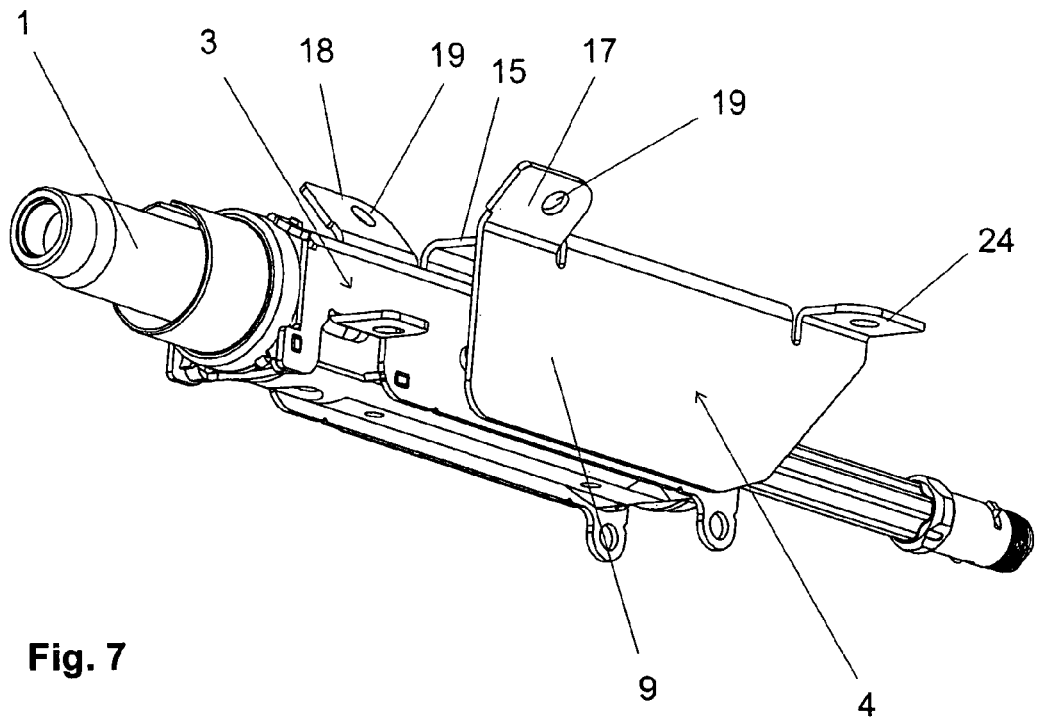
FIG. 7 shows a steering column according to a further embodiment of the invention in oblique view.

A further embodiment of the invention is depicted in FIG. 7. The steering spindle 1 is again pivotably supported in a jacket unit 3. The jacket unit 3 is borne by a securement unit 4, which includes side jaws 9, 10 extending on both sides of the jacket unit 3. The jacket unit 3 in this embodiment is rigidly connected with the side jaws 9, 10. Accordingly, in this embodiment the jacket unit 3 is neither displaceable in terms of height nor length with respect to the securement unit 4.

The securement unit 4 comprises first and second securement plates 17, 18 which, in the same manner as previously described, are inclined with respect to the side jaws 9, 10 of securement unit 4. These securement plates 17, 18 again extend from the upper ends of side jaws 9, 10.

The securement unit 4 further comprises third and fourth securement plates 24, 25, which also extend from the upper ends of side jaws 9, 10 and are at right angles to the jaws 9, 10. The third and fourth securement plates 24, 25 are further removed from the steering wheel-side end 2 of steering spindle 1 than the first and second securement plates 17, 18.

It is alternatively also conceivable and feasible to dispose the third and fourth securement plates 24, 25 closer to the steering wheel-side end 2 of the steering spindle than the first and second securement plates 17, 18. This can be reasonable when there is a corresponding distribution of the loadings onto the steering column. The same applies also to other embodiments of the invention. In the case of adjustable steering columns, the angled-off securement plates 17, 18 are advantageously disposed on the axial section of the longitudinal axis 8 in which the fixing device 7 is disposed.

The securement unit 4 could again include reinforcement elements, for example, analogously to the reinforcement beads 28, 29, flanging-over 30, 31 and the reinforcement sheet metal 32 (not shown in FIG. 7) described in connection with the first embodiment.

The securement unit 4 again could also be realized as a multipart unit. The securement plates 17, 18, 24, 25 could again be disposed on a securement part of the securement unit 4, which is again dislocatable with respect to the base section under the consumption of energy in order to degrade energy in the event of a crash.

Figure 8:
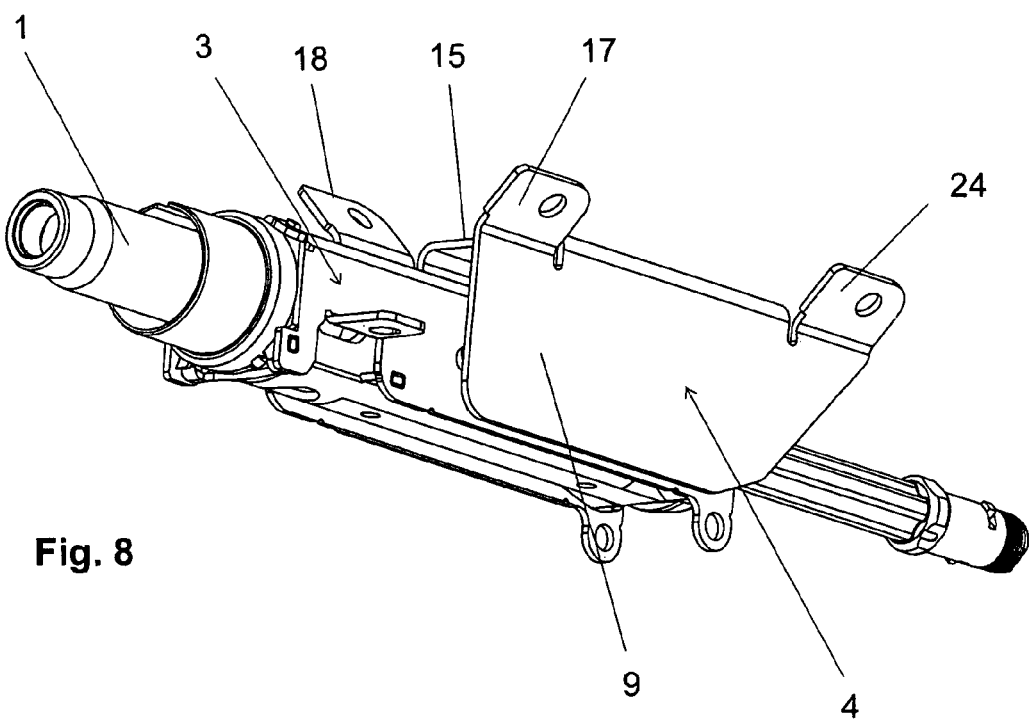
FIG. 8 shows a third embodiment of a steering column according to the invention.

Compared to the embodiment depicted in FIG. 7, the third embodiment example depicted in FIG. 8 differs only by the position of the third and fourth securement plates 24, 25. Analogously to the first and second securement plates 17, 18, these are inclined with respect to the side jaws 9, 10, for example by an angle of 45°. The inclination again takes place about an axis parallel to the longitudinal axis 8 of steering spindle 1. The third and fourth securement plates 24, 25 have the same angles of inclination as the first and second securement plates 17, 18.

Various modification of the depicted embodiment examples are conceivable and feasible without leaving the scope of the invention.

The steering column can include, for example, different types of adjustment mechanisms for the axial displacement of the steering spindle 1 and/or inclination adjustment of the steering spindle 1, which can be implemented in conventional manner. Apart from fixing devices acting under frictional locking, fixing devices acting under form-locking or form- and frictionally-locking devices can also be applied, such as are known in prior art.

The body-stationary motor vehicle part 16 can be directly a part of the motor vehicle body or a part secured on the motor vehicle body, which, at least in normal operation, is rigidly connected with the motor vehicle body (dislocations in the event of a crash can also be made possible).

Instead of in the form of holes, the bolt openings 19 can also be formed by slit-shaped recesses open toward the edge of the securement plates 17, 18, 24, 25.

In addition to the first and second securement plates 17, 18, the steering column according to the invention can also comprise at least one further securement element for the securement on a body-stationary motor vehicle part, which is realized in a form other than as a securement plate serving for bolting. For example, it can be formed as a hook-shaped part.

Instead of by two side jaws 9, 10 parallel to the vertical plane 22, only a single such side jaw 9, 10 can be provided, wherein in this case at least the securement plate 17, 18 located on the side of the vertical plane 22 opposite the side jaw 9, 10, would extend from the base section 15 of the securement unit 4 located above (referring to the installation position) the steering spindle 1.

Legend to the Reference Numbers:
1 Steering spindle
2 End
3 Jacket unit
4 Securement unit
5 Holding part
6 Swivel axis
7 Fixing device
8 Longitudinal axis
9 Side jaw
10 Side jaw
11 Fixing bolt
12 Link washer
13 Actuation lever
14 Clamping axis
15 Base section
16, 16' Motor vehicle part
17, 17' First securement plate
18, 18' Second securement plate
19 Bolt opening
20 Longitudinal axis
21 Longitudinal axis
22 Vertical plane
23 Deflection point
24 Third securement plate
25 Fourth securement plate
26 Transverse web
27 Bolt opening
28 Reinforcement bead
29 Reinforcement bead
30 Flanging-over
31 Flanging-over
32 Reinforcement sheet metal
33 Elongated hole
34 Positioning means

The invention claimed is:

1. A steering column for a motor vehicle, comprising:
a steering spindle pivotably supported by a jacket unit; and
a securement unit rigidly securable in position on the motor vehicle and bearing the jacket unit, the securement unit including:
a base section;
at least one side jaw extending next to the jacket unit; and
first and second securement plates with bolt openings for securing in place the securement unit on the motor vehicle by securement bolts, wherein the first and second securement plates are inclined away from each other so as to each form an angle with respect to a plane of the at least one side jaw in a range between 30 degrees and 60 degrees.

2. The steering column as claimed in claim 1, wherein the first and second securement plates are disposed bilaterally with respect to a vertical plane extending through the steering spindle and are inclined away from the vertical plane.

3. The steering column as claimed in claim 1, wherein the first and second securement plates are located equidistant from a steering wheel-side end of the steering spindle.

4. The steering column as claimed in claim 1, wherein the at least one side jaw of the securement unit comprises two parallel side jaws which extend bilaterally with respect to the jacket unit and are connected with the base section.

5. The steering column as claimed in claim 4, wherein the first securement plate extends from a first one of the two side jaws, and the second securement plate extends from a second one of the two side jaws.

6. The steering column as claimed in claim 1, wherein the first and the second securement plate are located in the proximity of the particular bolt opening in first and second planes, which intersect within the jacket unit, or within the steering spindle.

7. The steering column as claimed in claim 1, wherein the securement unit further includes at least one further securement element for securing the securement unit on the motor vehicle.

8. The steering column as claimed in claim 7, wherein the at least one further securement element is located a greater distance from a steering wheel-side end of the steering spindle than the first and second securement plates.

9. The steering column as claimed in claim 7, wherein the at least one further securement element of the securement unit comprises third and fourth securement plates disposed bilaterally to a vertical plane extending through the steering spindle.

10. The steering column as claimed in claim 9, wherein the third and fourth securement plate are each inclined by an angle in the range between 30 degrees and 60 degrees with respect to the at least one side jaw.

11. The steering column as claimed in claim 9, wherein the at least one side jaw comprises at least two side jaws, the third securement plate extends from a first one of the at least two side jaws, and the fourth securement plate extends from a second one of the at least two side jaws.

12. The steering column as claimed in claim 1, wherein the jacket unit is displaceable in at least one displacement direction with respect to the securement unit.

13. The steering column as claimed in claim 12, wherein the jacket unit is displaceable with respect to the securement unit in at least one of a longitudinal direction of the steering spindle and a direction of an inclination adjustment of the steering spindle.

14. The steering column as claimed in claim 1, wherein the at least one side jaw extends in a plane parallel to a vertical plane extending through the steering spindle.

* * * * *